US011007857B2

(12) United States Patent
Ito

(10) Patent No.: US 11,007,857 B2
(45) Date of Patent: May 18, 2021

(54) VEHICLE DRIVING APPARATUS

(71) Applicant: Daimler AG, Stuttgart (DE)

(72) Inventor: Maki Ito, Kawasaki (JP)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/642,775

(22) PCT Filed: Jul. 20, 2018

(86) PCT No.: PCT/JP2018/027320
§ 371 (c)(1),
(2) Date: Feb. 27, 2020

(87) PCT Pub. No.: WO2019/044262
PCT Pub. Date: Mar. 7, 2019

(65) Prior Publication Data
US 2021/0078397 A1 Mar. 18, 2021

(30) Foreign Application Priority Data

Aug. 31, 2017 (JP) .............................. JP2017-166957
Dec. 15, 2017 (JP) .............................. JP2017-240483

(51) Int. Cl.
*B60K 1/00* (2006.01)
*B60K 17/16* (2006.01)
*B60K 17/08* (2006.01)

(52) U.S. Cl.
CPC ................ *B60K 1/00* (2013.01); *B60K 17/16* (2013.01); *B60K 17/08* (2013.01); *B60K 2001/001* (2013.01); *B60Y 2200/91* (2013.01)

(58) Field of Classification Search
None
See application file for complete search history.

(56) References Cited

U.S. PATENT DOCUMENTS 1,182,104 A * 5/1916 Remy et al. ........... B62D 11/08
180/6.66
1,345,421 A * 7/1920 Van Vleet ................ B60G 9/00
280/124.111

(Continued)

FOREIGN PATENT DOCUMENTS

CN       106183678 A    12/2016
DE       42 07 051 A1   9/1993
(Continued)

OTHER PUBLICATIONS

PCT/JP2018/027320, International Search Report dated Sep. 25, 2018, with English translation (Three (3) pages).

*Primary Examiner* — Dirk Wright
(74) *Attorney, Agent, or Firm* — Crowell & Moring LLP

(57) ABSTRACT

A vehicle driving apparatus includes axle housings to which a differential-side housing is coupled, the axle housings integrally housing drive shafts of driving wheels, first support sections that couple first rotary support shafts coupled to a vehicle body and the axle housings and perform a swing motion with the first rotary support shafts as a rotation center to thereby support the axle housings on the vehicle body, and second support sections that elastically couple second rotary support shafts supported on the vehicle body via rail structures and a motor-side housing and perform a swing motion with the second rotary support shafts as a rotation center to thereby support the motor-side housing on the vehicle body. The rail structures are configured such that the second rotary support shafts are movable in a vehicle front-rear direction.

5 Claims, 8 Drawing Sheets

(56) References Cited

U.S. PATENT DOCUMENTS

| | | | | | |
|---|---|---|---|---|---|
| 3,292,943 | A | * | 12/1966 | Crockett | B60G 9/02 |
| | | | | | 280/104 |
| 3,473,821 | A | * | 10/1969 | Barenyi | B60G 3/24 |
| | | | | | 280/124.111 |
| 3,605,929 | A | * | 9/1971 | Rolland | B62D 61/08 |
| | | | | | 180/208 |
| 4,003,443 | A | * | 1/1977 | Boughers | B62D 61/08 |
| | | | | | 180/217 |
| 4,429,760 | A | * | 2/1984 | Koizumi | B62D 61/08 |
| | | | | | 180/215 |
| 4,461,365 | A | * | 7/1984 | Diggs | B62M 7/16 |
| | | | | | 180/11 |
| 4,469,188 | A | * | 9/1984 | Mita | B62K 11/00 |
| | | | | | 180/215 |
| 4,520,890 | A | * | 6/1985 | Maher | B62M 27/02 |
| | | | | | 180/193 |
| 4,582,157 | A | * | 4/1986 | Watanabe | B62K 5/027 |
| | | | | | 180/215 |
| 4,647,067 | A | * | 3/1987 | Paquette | B60G 21/04 |
| | | | | | 280/124.111 |
| 4,877,102 | A | * | 10/1989 | Stewart | B62K 5/01 |
| | | | | | 180/217 |
| 5,107,952 | A | * | 4/1992 | Matsubayashi | B62K 5/01 |
| | | | | | 180/215 |
| 5,467,839 | A | * | 11/1995 | Yoshio | B60K 5/00 |
| | | | | | 180/233 |
| 5,575,352 | A | * | 11/1996 | Suzuki | B62K 5/01 |
| | | | | | 180/311 |
| 5,845,918 | A | * | 12/1998 | Grinde | B60G 7/02 |
| | | | | | 280/124.1 |
| 5,871,218 | A | * | 2/1999 | Lepage | B62B 3/1492 |
| | | | | | 280/33.992 |
| 5,878,479 | A | * | 3/1999 | Dickerson | F16D 65/128 |
| | | | | | 29/527.6 |
| 5,890,980 | A | * | 4/1999 | Heyng | F16D 65/128 |
| | | | | | 474/158 |
| 5,921,341 | A | * | 7/1999 | Atkins | B60G 7/001 |
| | | | | | 180/350 |
| 5,992,587 | A | * | 11/1999 | Maldonado | B60T 1/065 |
| | | | | | 180/219 |
| 6,283,255 | B1 | * | 9/2001 | Gardner | B60T 1/065 |
| | | | | | 188/18 A |
| 6,675,926 | B2 | * | 1/2004 | Montague | B60G 9/02 |
| | | | | | 180/350 |
| 8,322,737 | B2 | * | 12/2012 | Dodd | F16D 51/20 |
| | | | | | 280/124.128 |
| 8,567,548 | B2 | * | 10/2013 | Thill | B60G 7/001 |
| | | | | | 180/215 |

FOREIGN PATENT DOCUMENTS

| | | |
|---|---|---|
| JP | 50-8609 U | 1/1975 |
| JP | 2001-1774 A | 1/2001 |
| WO | WO 2014/148410 A1 | 9/2014 |

* cited by examiner

[Fig. 1]
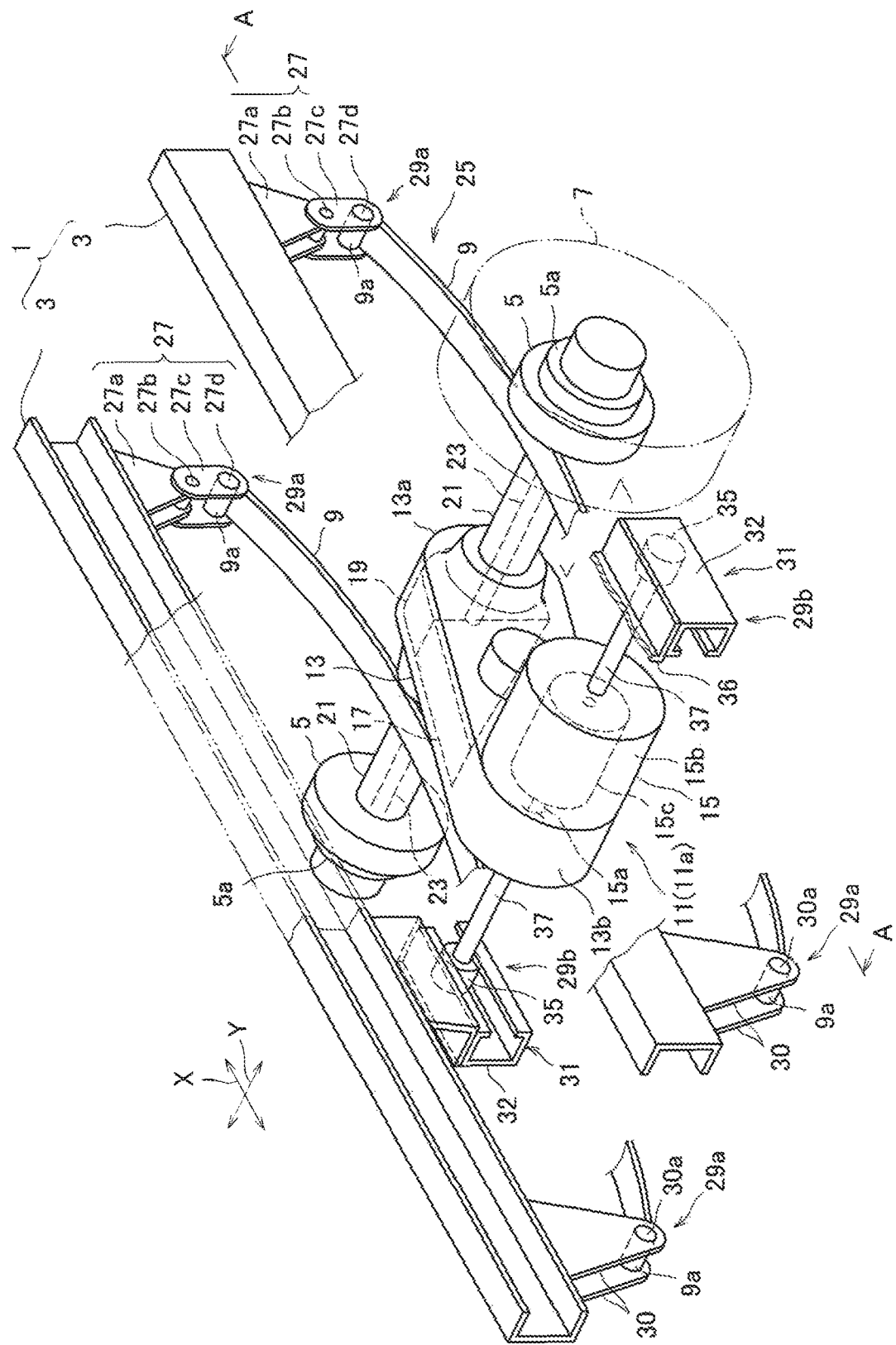

[Fig. 2]
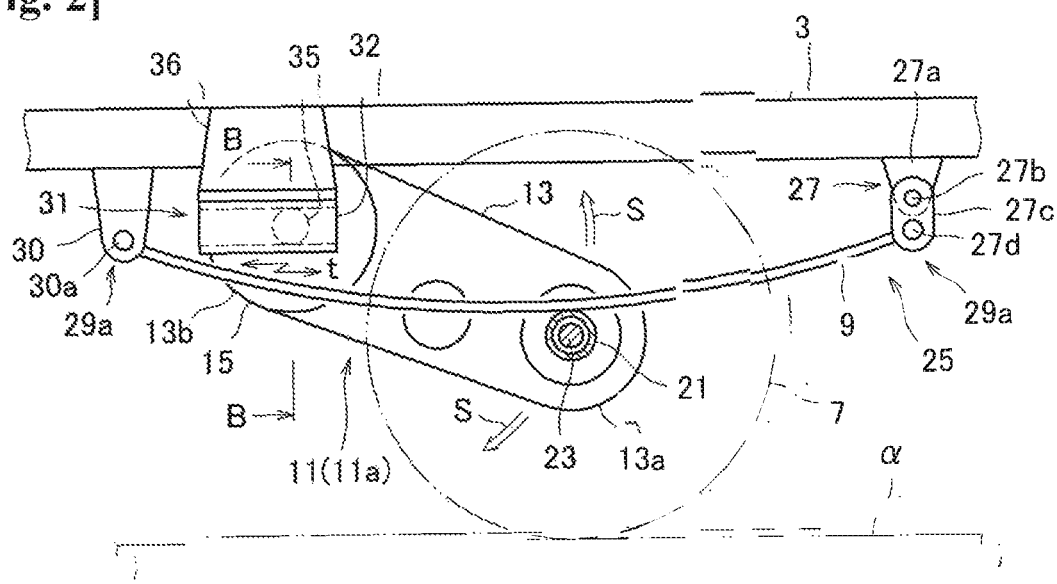
[Fig. 3]
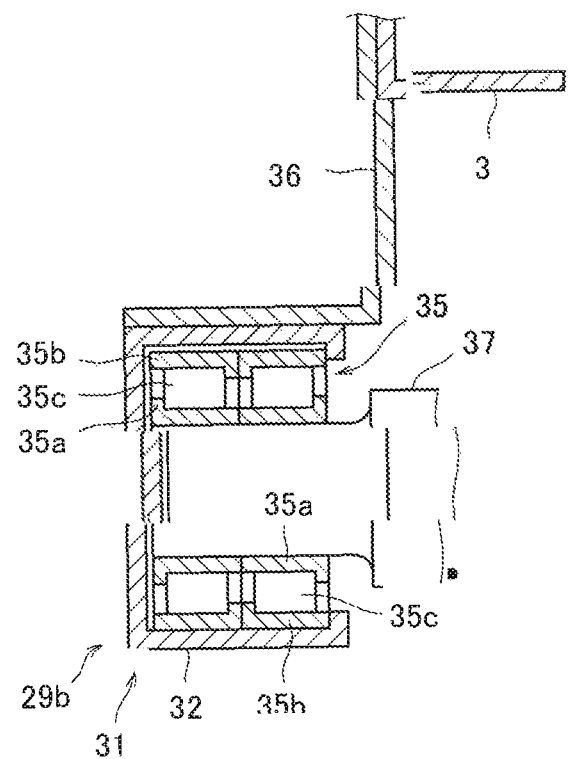

[Fig. 4A]
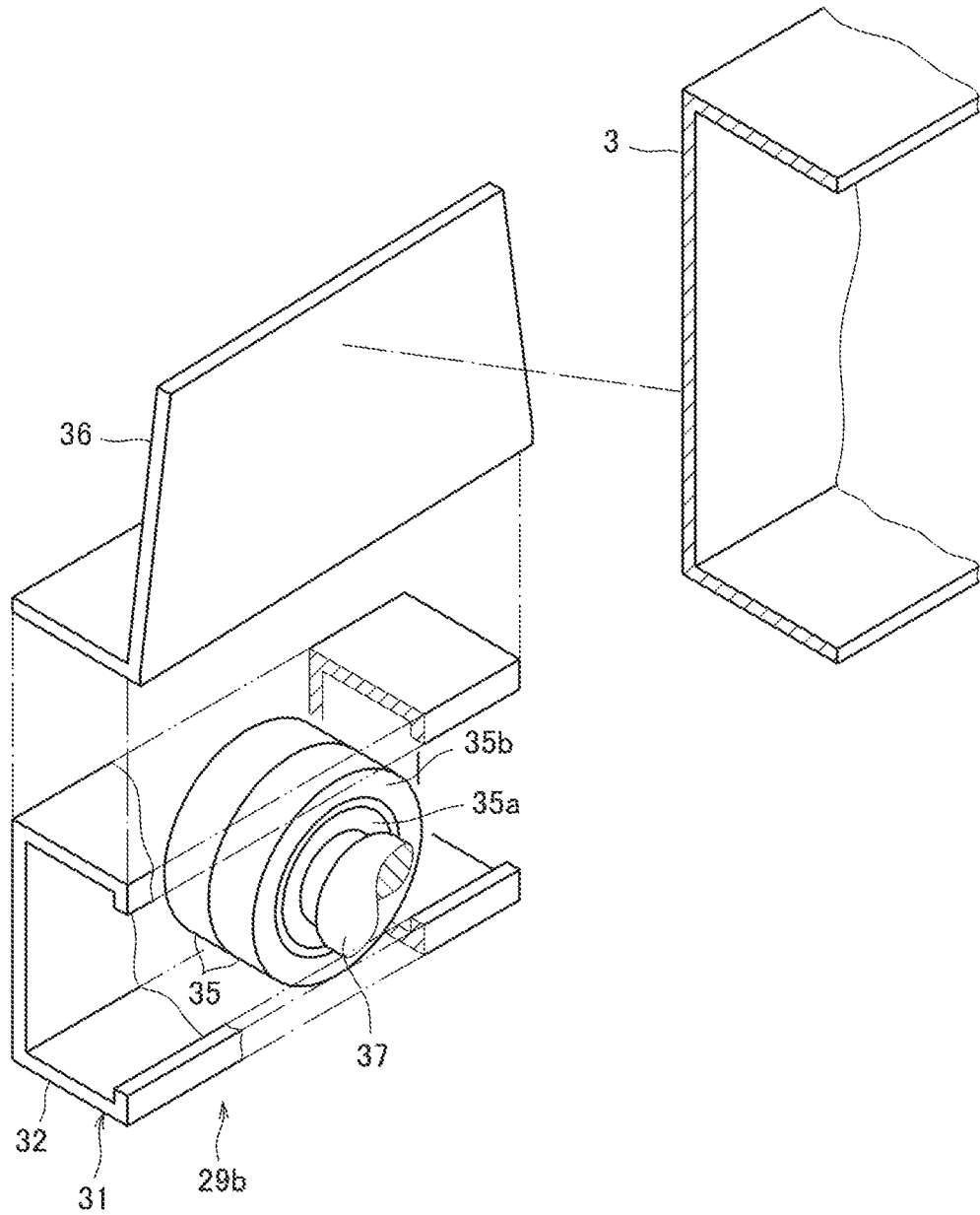
[Fig. 4B]
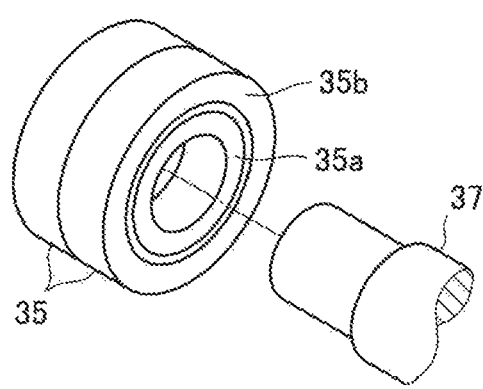

[Fig. 5A]
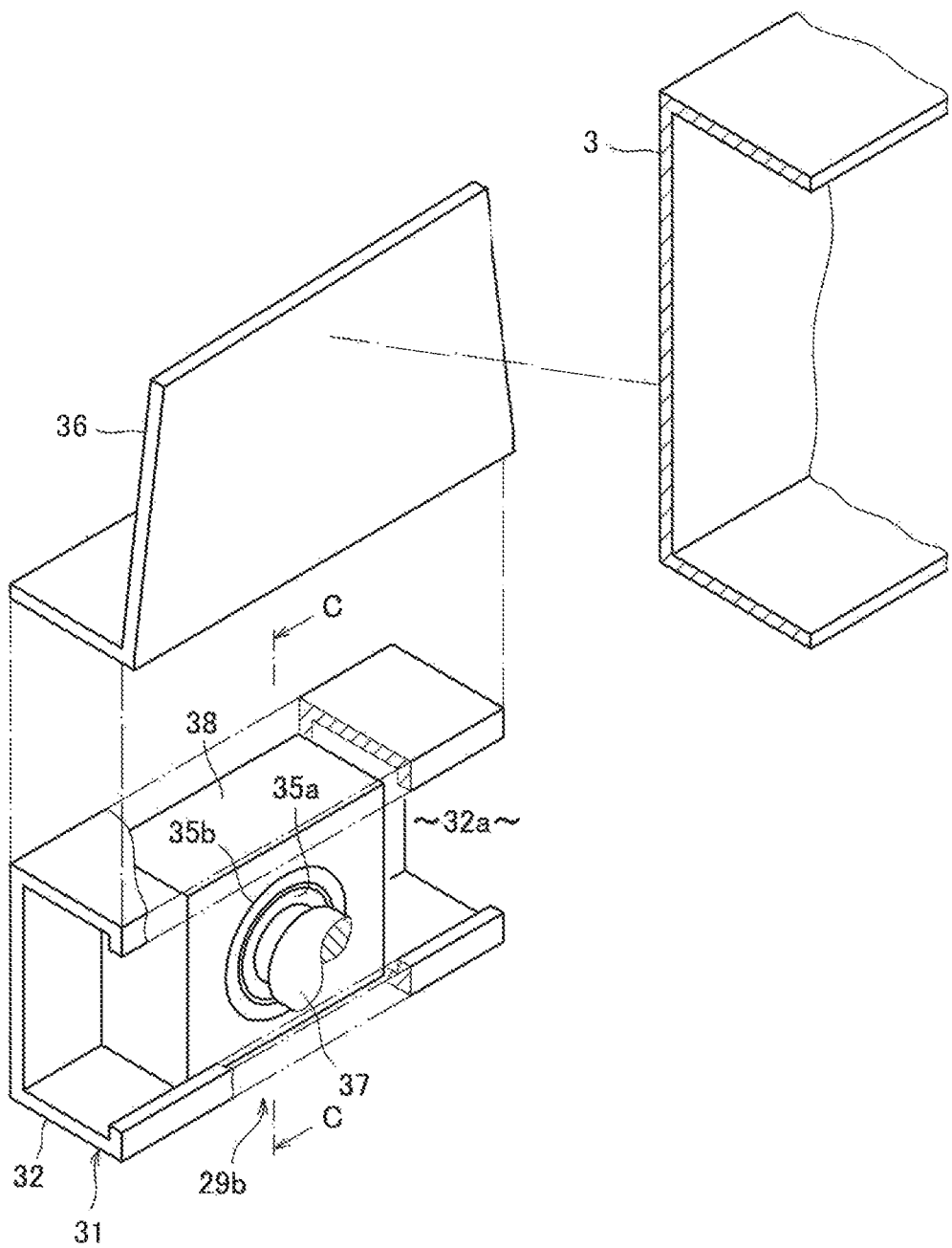

[Fig. 5B]
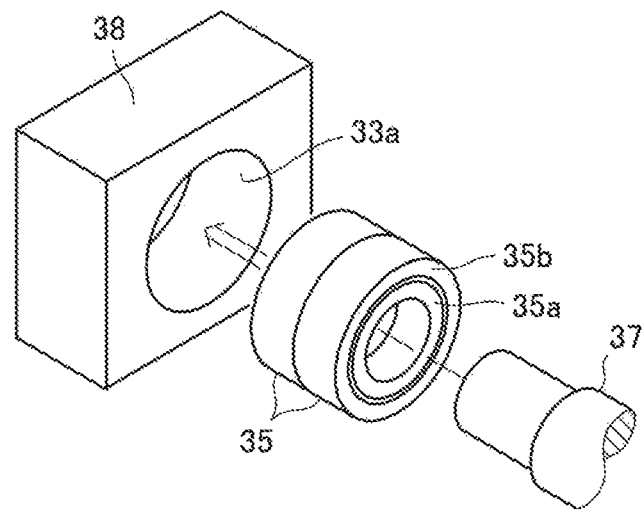
[Fig. 6]
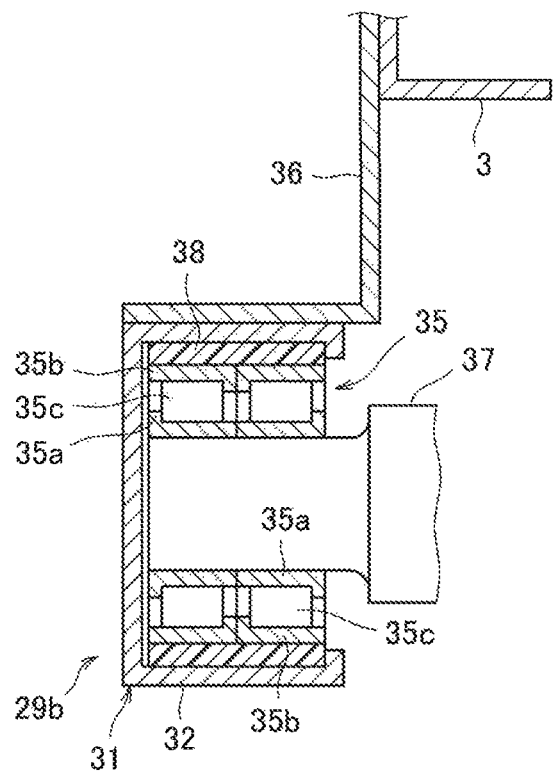

[Fig. 7]
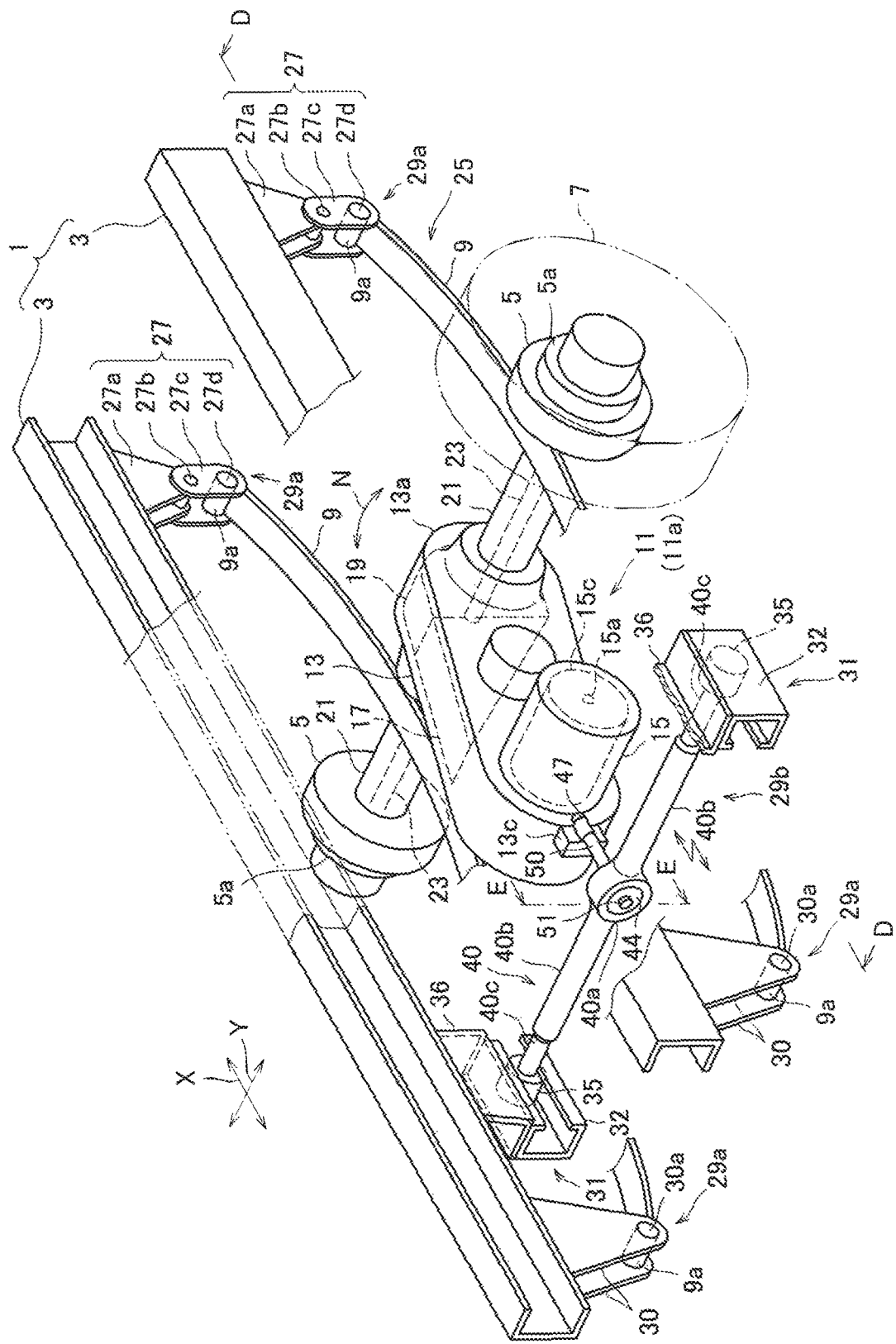

[Fig. 8]
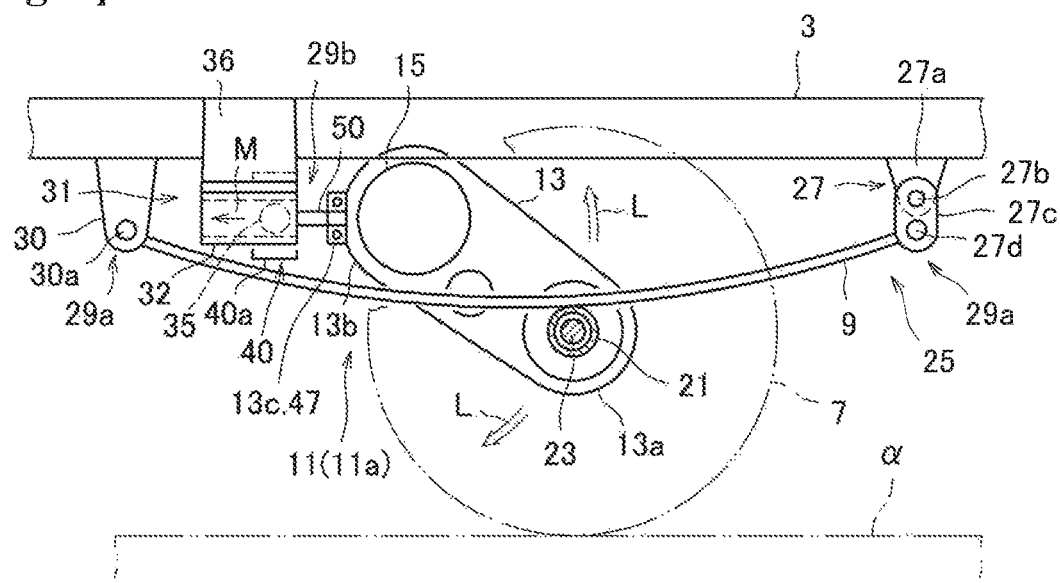
[Fig. 9]
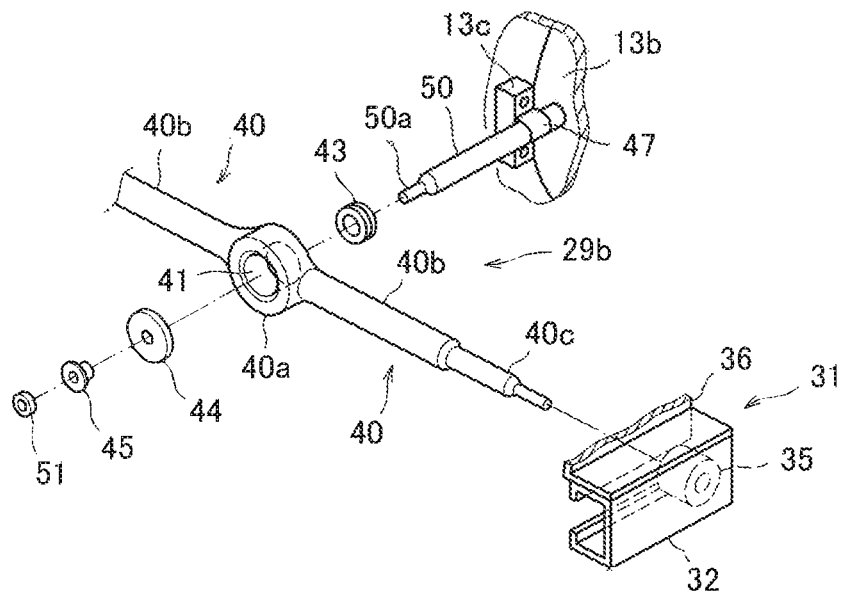

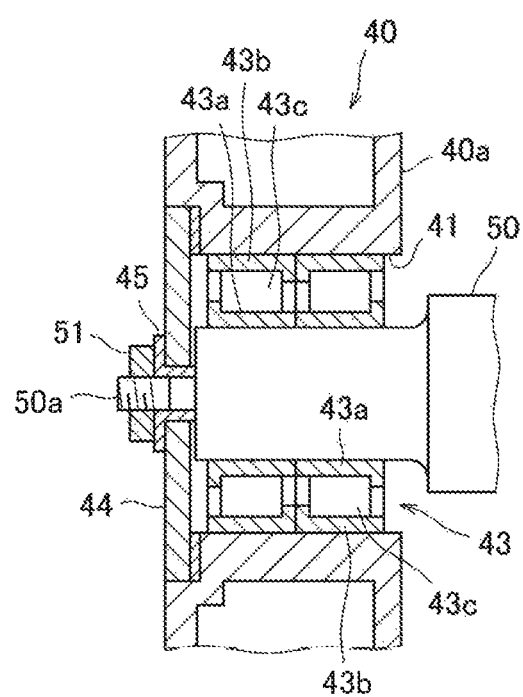
[Fig. 10]

VEHICLE DRIVING APPARATUS

TECHNICAL FIELD

The present invention relates to a vehicle driving apparatus suitable for an electric vehicle.

BACKGROUND ART

As a vehicle driving apparatus, there has been known a driving unit in which a driving motor and a speed reducer are integrally provided in a differential gear (see, for example, Patent Literature 1).

CITATION LIST

Patent Literature

[Patent Literature 1] WO 2014/148410

SUMMARY OF THE INVENTION

Problem to be Solved by the Invention

In commercial vehicles such as a truck, there are various vehicle classes for each of vehicle specifications. According to the vehicle classes, there are also various vehicle widths in which a driving device is mountable. As an axle structure adaptable to such various vehicle classes, there is a rigid axle structure including an axle housing that houses an axle.

However, in such a rigid axle structure, when the driving unit is mounted, the entire driving unit is unsprung supported together with the axle housing. Therefore, vibration input to a motor mounted on the driving unit increases. It is likely that reliability of the motor is deteriorated.

Therefore, an object of the present invention is to provide a vehicle driving apparatus that is adaptable to various vehicle classes and can secure reliability of a motor.

Arrangement for Solving the Problem

The present invention can be realized as the following application example. A vehicle driving apparatus according to this application example is a vehicle driving apparatus including a driving unit housing that integrally houses a motor that drives a vehicle, a speed reducer coupled to the motor, and a differential gear coupled to the speed reducer, the differential gear transmitting a driving force of the motor to driving wheels of the vehicle. The vehicle driving apparatus includes: an axle housing to which a differential-side housing of the driving unit housing is coupled, the axle housing integrally housing a drive shaft of the driving wheels; a first support section that elastically couples a first rotary support shaft coupled to a vehicle body of the vehicle and the axle housing and performs a swing motion with the first rotary support shaft as a rotation center to thereby support the axle housing on the vehicle body; and a second support section that couples a second rotary support shaft supported on the vehicle body of the vehicle via a rail structure and a motor-side housing of the driving unit housing and performs a swing motion with the second rotary support shaft as a rotation center to thereby support the motor-side housing on the vehicle body. The rail structure is configured such that the second rotary support shaft is movable in a vehicle front-rear direction.

With the configuration, for example, during traveling of the vehicle, when the axle housing elastically coupled to the first support section and the second support section is displaced in the up-down direction because, for example, the driving wheel climbs over a protrusion on a road surface, a shock and a load input to the driving unit housing are absorbed by a swing motion of the driving unit housing corresponding to the displacement in the up-down direction of the axle housing.

That is, in the driving unit housing in which the devices are integrally housed, the swing motion with the second rotary support shaft as the rotation center occurs in which the differential-side housing including the axle housing is displaced in the up-down direction according to the displacement in the up-down direction of the axle housing and the motor-side housing coupled to the second rotary support shaft is displaced (moved) in the vehicle front-rear direction on the rail structure.

According to the swing motion of the driving unit housing, the shock and the load input to the driving unit housing are allowed to escape. Therefore, the devices including the motor integrally attached to the driving unit housing are protected from a shock and a load applied to the devices. A driving unit housing structure including the rigid axle has relatively large weight. Therefore, in the swing motion, stress in the vehicle front-rear direction occurs in the second rotary support shaft coupled to the motor-side housing of the driving unit housing. Consequently, it is likely that reliability of the motor is deteriorated. However, by adopting a configuration in which the second rotary support shaft is movable in the vehicle front-rear direction in the rail structure in such a vehicle driving apparatus, it is possible to reduce the stress in the vehicle front-rear direction in the second rotary support shaft. It is possible to secure the reliability of the motor. Therefore, since the vehicle driving apparatus includes the rigid axle, the vehicle driving apparatus is not only adaptable to various vehicle classes but also can sufficiently secure the reliability of the motor.

In the vehicle driving apparatus according to this application example, the second rotary support shaft may be provided such that a rotation center of the motor and a rotation center of the second rotary support shaft coincide with each other.

With such a configuration, it is possible to reduce the shock and the load input to the motor. Therefore, it is possible to more surely secure the reliability of the motor.

In the vehicle driving apparatus according to this application example, the rail structure may include a rail groove body extending in the vehicle front-rear direction provided in the vehicle body of the vehicle and a circular bearing supported by the second rotary support shaft and displaceably housed in the rail groove body.

With such a configuration, the rail structure only has to have structure in which the rail groove body and the circular bearing are combined with the second rotary support shaft. Therefore, the rail structure is simple and excellent in strength.

In the vehicle driving apparatus according to this application example, the rail structure may include a rail groove body extending in the vehicle front-rear direction provided in the vehicle body of the vehicle and a sliding block supported by the second rotating shaft and displaceably housed in the rail groove body.

With such a configuration, the rail structure only has to have simple structure. The swing motion of the driving unit housing is smoothly performed by the sliding block that slides in the rail groove body. Therefore, it is possible to suppress occurrence of noise. Moreover, since the shock and the load are transmitted via the sliding block, the motor can sufficiently withstand the shock and the load applied to the motor.

In the vehicle driving apparatus according to this application example, the second support section may couple the second rotary support shaft and the motor-side housing of the driving unit housing via a third rotary support shaft, and the third rotary support shaft may be coupled to the second rotary support shaft so as to be rotatable with the third rotary support shaft as a rotation center, thereby supporting the motor-side housing on the second rotary support shaft.

With such a configuration, by adopting the configuration in which the second rotary support shaft is movable in the vehicle front-rear direction and the third rotary support shaft is rotatably coupled to the second rotary support shaft, it is possible to reduce the stress in a vehicle front-rear direction input to the second rotary support shaft and the stress in a torsional direction input to the third rotary support shaft. Consequently, it is possible to secure the reliability of the motor.

BRIEF DESCRIPTION OF THE DRAWINGS

FIG. 1 is perspective view showing a vehicle driving apparatus assembled to a vehicle according to a first embodiment of the present invention.

FIG. 2 is a side view of the vehicle driving apparatus viewed from an arrow A in FIG. 1.

FIG. 3 is a sectional view showing structure around a rail structure extending taken along a B-B line in FIG. 2.

FIG. 4A is an exploded perspective view of a part of the rail structure.

FIG. 4B is an exploded perspective view of each section.

FIG. 5A is a perspective view showing structure around a rail structure according to a second embodiment of the present invention.

FIG. 5B is an exploded perspective view of each section.

FIG. 6 is a sectional view around the rail structure taken along a C-C line in FIG. 5.

FIG. 7 is a perspective view showing a vehicle driving apparatus assembled to a vehicle according to a third embodiment of the present invention.

FIG. 8 is a side view of the vehicle driving apparatus viewed from an arrow D in FIG. 7.

FIG. 9 is a perspective view showing a structure that makes a drive unit housing rotatable with respect to a vehicle body.

FIG. 10 is a sectional view along an E-E line in FIG. 7.

MODE FOR CARRYING OUT THE INVENTION

First Embodiment

The present invention is explained below on the basis of a first embodiment shown from FIG. 1 to FIGS. 4A and 4B. FIG. 1 shows lower part structure of a rear part of a commercial electric vehicle (hereinafter referred to as vehicle) such as a truck. In FIG. 1, an X direction indicates a vehicle front-rear direction and a Y direction indicates a vehicle width direction.

The lower part structure of the electric vehicle is explained. A member 1 in FIG. 1 is a frame configuring a chassis. The frame 1 is configured in a ladder shape from a pair of side rails 3 extending in the vehicle front-rear direction and a plurality of cross members (not shown in the figure) provided between the pair of side rails 3.

On vehicle width direction both sides of the side rails 3, drum brakes 5 and driving wheels 7 (only the driving wheel 7 on one side is indicated by an alternate long and short two dashes line) attached to the drum brakes 5 are respectively disposed. Further, spring members, for example, leaf springs 9 extending in the vehicle front-rear direction are respectively disposed right under the side rails 3. Both end portions of the leaf springs 9 include cylindrical sections 9a attached with bushes (not shown in the figure). A driving device 11 (equivalent to the vehicle driving apparatus of this application) forming a driving system of the electric vehicle is disposed between rear parts of the side rails 3.

The driving device 11 is a driving unit 11a obtained by integrally assembling devices of the driving system. Specifically, the driving unit 11a includes a box-shaped unit housing 13 (equivalent to the driving unit housing of this application) extending in the vehicle front-rear direction. A motor 15 that drives the vehicle is assembled sideways on a front side (in the vehicle front-rear direction) of the unit housing 13. A speed reducer 17 is housed in an intermediate part in the front-rear direction of the unit housing 13. A differential gear 19 is housed on a rear side (n the vehicle front-rear direction) of the unit housing 13. That is, the unit housing 13 includes the motor 15, the speed reducer 17, and the differential gear 19.

A pair of cylindrical axle housings 21 is coupled to both side of a differential-side housing 13a of the unit housing 13. The axle housings 21 are coupled to the drum brake 5. Drive shafts 23 are rotatably housed on the insides of the axle housings 21. The drive shafts 23 are integrally housed in the axle housings 21 and supported. The drive shafts 23 dynamically connect left and right output sections (not shown in the figure) of the differential gear 19 and wheel attaching sections 5a of the drum brake 5. A driving force output from the differential gear 19 is transmitted to the driving wheels 7.

An input section (not shown in the figure) of the speed reducer 17 is dynamically coupled to a motor shaft 15a of the motor 15, specifically, the motor shaft 15a attached to a rotor 15c. An output section (not shown in the figure) of the speed reducer 17 is dynamically coupled to an input section (not shown in the figure) of the differential gear 19. A driving force output from the motor 15 is transmitted to the differential gear 19 through the speed reducer 17 and allocated to the drive shafts 23 on the left and the right from the differential gear 19. That is, the driving unit 11a transmits the driving force of the motor 15 to the driving wheels 7 on the left and the right.

The driving unit 11a (the driving device 11) is supported by the side rails 3, which are the vehicle body, using a suspension device 25 including the left and right leaf springs 9. In the vehicle driving apparatus according to this embodiment, this supporting structure is elaborated. Sections of the supporting structure are shown in a side view of FIG. 2 (an arrow A in FIG. 1), a sectional view of FIG. 3 (a B-B line in FIG. 2), and exploded perspective views of FIGS. 4A and 4B.

The supporting structure is explained with reference to FIG. 2 and FIGS. 4A and 4B. The driving unit 11a is disposed between the side rails 3 in a posture oblique in the vehicle front-rear direction in which a differential side is the lower side and a motor side is the upper side.

The axle housings 21 sticking out from the differential-side housing 13a of the driving unit 11a are supported in longitudinal direction centers of the left and right leaf springs 9. For example, the axle housings 21 are supported by the leaf springs 9 using saddle members and U-shaped bolts (both of which are not shown in the figure).

End portions on rear sides (in the vehicle front-rear direction) of the leaf springs 9 are turnably supported in lower parts of the side rails 3 (the vehicle body) via link mechanisms 27. Specifically, the link mechanisms 27 are configured by mechanisms stretchable and displaceable in the up-down direction. For example, each of the link mechanisms 27 is configured by two sheet metal members 27a, which retain a predetermined interval, provided to stick out downward from the side rail 3 and two sheet metal members 27c turnably supported via lower parts of the sheet metal members 27a and a coupling pin 27b. The cylindrical section 9a on the rear side of the leaf spring 9 is interposed between lower parts of the sheet metal members 27c.

A pin member 27d (equivalent to the first rotary support shaft of this application) is inserted through between the two sheet metal members 27c and the cylindrical section 9a to cross the two sheet metal members 27c and the cylindrical section 9a and configures a shackle link that supports an end of the leaf spring 9. That is, a first support section 29a, which rotatably supports the cylindrical section 9a of the leaf spring 9 with respect to the side rail 3 (the vehicle body), is configured by the pin member 27d.

An end portion on a front side (in the vehicle front-rear direction) of the leaf spring 9 is rotatably supported by a bracket 30 installed in a lower part of the side rail 3 on the opposite side of the link mechanism 27 across the axle housing 21. Specifically, the bracket 30 is configured from two sheet metal members. The cylindrical section 9a on the front side of the leaf spring 9 is interposed between the two sheet metal members. A pin member 30a (equivalent to the first rotary support shaft of this application) is inserted through the bracket 30 and the cylindrical section 9a to cross the bracket 30 and the cylindrical section 9a and, in the same manner as on the rear side, configures the first support section 29a that rotatably supports the cylindrical section 9a of the leaf spring 9 with respect to the side rail 3 (the vehicle body).

A pair of rail structures 31 is installed in lower parts of side rails 3 between the brackets 30 and the axle housings 21. A motor-side housing 13b of the driving unit 11a is supported by the rail structures 31.

This supporting structure is explained with reference to FIG. 3 and FIGS. 4A and 4B. First, the rail structures 31 are explained. For example, the rail structures 31 include rail groove bodies 32 formed in a substantially C shape in cross section and circular bearings 35 rollably housed in substantially C-shaped rail grooves formed by the rail groove bodies 32. As the circular bearings 35, for example, two-row roller bearings, in which pluralities of rollers 35c are interposed between circular inner laces 35a and circular outer laces 35b, are used.

The rail groove bodies 32 have a predetermined length in the X direction. The rail groove bodies 32 are disposed on vehicle width direction both sides of the motor-side housing 13b (including the motor 15) of the driving unit 11a such that openings of the rail groove bodies 32 face the vehicle width direction inner side and the rail groove bodies 32 extend in the vehicle front-rear direction. The rail groove bodies 32 are attached to lower parts of tabular brackets 36 stretching out from the side rails 3 to the lower side in a predetermined manner. The rail groove bodies 32 are disposed in the same direction as the direction of the side rails 3 at points on the vehicle width direction outer side from the side rails 3.

On the other hand, support shafts 37 (equivalent to the second rotary support shaft of this application) are respectively protrudingly provided from housing portions on the motor side, which are both side sections of the motor-side housing 13b (the driving unit 11a) as shown in FIG. 1, and end walls of a motor housing 15b forming an outer shell of the motor 15. The support shafts 37 extending in the left-right direction (the vehicle width direction) have a length dimension reaching the left and right rail groove bodies 32. Both of the support shafts 37 may project to both sides from substantially the same position as the rotation center of the motor shaft 15a of the motor 15. That is, the support shafts 37 can be provided in positions substantially coinciding with the rotation center of the motor 15.

The circular bearings 35 housed in the rail groove bodies 32 are attached to the distal end portions of the support shafts 37. Specifically, the distal end portions of the support shafts 37 configure second support sections 29b that are fit into (pressed into) the inner laces 35a of the circular bearings 35 and allow the motor-side housing 13b to rotate with respect to the side rails 3 (the vehicle body) and move in the front-rear direction.

Consequently, for example, when the driving wheel 7 climbs over a protrusion on a road surface α, with the differential-side housing 13a including the axle housings 21 set on a movable side, the entire driving unit 11a is swung around the support shafts 37.

Specifically, the leaf springs 9 elastically support the axle housings 21 with the pin members 27d and 30a as a fixed fulcrum and with the rail groove bodies 32 and the circular bearings 35 as a movable fulcrum. That is, the axle housings 21 are elastically supported while involving a behavior in which the movable fulcrums are displaced in the vehicle front-rear direction. The driving unit 11a swings to be displaced with the circular bearings 35 and the support shafts 37 as a swing center in association with a movement in the up-down direction of the axle housings 21. A change in a fulcrum position of the circular bearings 35, which occurs at that time, is absorbed by the rail groove bodies 32.

That is, the driving unit 11a is capable of performing a swing motion from an axle rigid structure configured by combining the first support sections 29a, the second support sections 29b, and the rail structures 31 to prevent a shock and a load transmitted from the axle housings 21 from being applied to the driving unit 11a as much as possible. A shock absorber attached to the driving unit 11a is omitted.

Action of the driving device 11 configured as explained above is explained. The traveling of the vehicle is performed by actuation of the motor 15. That is, a driving force generated by the motor 15 is transmitted to the differential gear 19 through the speed reducer 17. The driving force is transmitted from the differential gear 19 to the left and right driving wheels 7 through the left and right drive shafts 23. The vehicle travels on the road surface α.

When a protrusion (not shown in the figure) such as a stone is present on the road surface α, the leaf springs 9 are displaced to the upper side or the leaf springs 9 is elastically deformed to the upper side. The driving wheel 7 climbs over the protrusion. A shock and a load involved in the climbing-over of the protrusion are input from the axle housings 21 to the differential-side housing 13a disposed on the oblique lower side of the driving unit 11a.

At this point, the motor-side housing 13b disposed on the oblique upper side of the driving unit 11a is connected to the circular bearings 35 in the rail groove bodies 32 via the support shafts 37 and supported to be displaceable in a rotating direction and the vehicle front-rear direction. Therefore, in the entire driving unit 11a, the differential-side housing 13a swings to be displaced to the upper side or the lower side with the motor-side housing 13b as a swing center. An arrow s in FIG. 2 indicates a swing track of the driving unit 11a at this point.

According to the swing of the driving unit 11a, the inner laces 35a of the circular bearings 35 rotate and the circular bearings 35 are displaced in the front-rear direction on the rail groove bodies 32. An arrow t in FIG. 2 indicates a direction in which the circular bearings 35 are displaced. Then, the entire driving unit 11a performs a swing motion with the circular bearings 35 and the support shafts 37 as a swing fulcrum.

Consequently, the shock and the load input to the driving unit 11a from the axle housings 21 are allowed to escape (absorbed) by the swing motion of the driving unit 11a that occurs according to the displacement in the up-down direction of the axle housing 21.

That is, since the driving unit 11a (the driving unit housing structure) including the rigid axle has relatively large weight, stress in the vehicle front-rear direction occurs in the support shafts 37 coupled to the motor-side housing 13b of the driving unit housing 13 when a swing motion is performed. Consequently, it is likely that reliability of the motor 15 is deteriorated. However, in the rail structures 31 in the driving device 11 (the vehicle driving apparatus), the configuration is adopted in which the support shafts 37 is movable in the vehicle front-rear direction. Therefore, it is possible to reduce the stress in the vehicle front-rear direction with the support shafts 37. It is possible to secure the reliability of the motor 15.

Therefore, since the driving device 11 (the vehicle driving apparatus) includes the rigid axle, the driving device 11 is not only adaptable to various vehicle classes but also can sufficiently secure the reliability of the motor 15.

When the rotation center of the support shafts 37 and the rotation center of the motor 15 coincide with each other, it is possible to more effectively reduce the shock and the load input to the motor 15 (the driving unit 11a). Moreover, the rail structures 31, which produce such effects, only have to have simple structure and are excellent in strength when the rail groove bodies 32 and the circular bearings 35 are combined with the support shafts 37.

Second Embodiment

FIGS. 5A, 5B and 6 show a second embodiment of the present invention. This embodiment is a modification of the first embodiment. The support shaft 37 can be moved in the vehicle front-rear direction using a sliding block 38.

Specifically, in structure including the sliding block 38, the sliding block 38 is slidably housed in a substantially C-shaped rail groove 32a formed by the rail groove body 32 as shown in FIG. 5 and FIG. 6 (a cross section taken along a C-C line in FIG. 5). The circular bearing 35 used in the first embodiment is pressed into an assembly opening 33a provided in a side surface of the sliding block 38. As the sliding block 38, for example, a block made of synthetic resin capable of smoothly sliding in the rail groove 32a, for example, a block made of nylon applied with rubber coating on the surface as a lubricant is used.

In the structure in which the sliding block 38 is housed in the rail structure 31, the sliding block 38 smoothly slides (is displaced) in the rail groove 32a. Therefore, occurrence of noise can be suppressed. Moreover, there is also an advantage that, since the shock and the load are transmitted via the sliding block 38, the motor can sufficiently withstand the shock and the load applied to the motor. Note that, in FIGS. 5A, 5B and 6, the same portions as the portions in the first embodiment are denoted by the same reference numerals and signs and explanation of the portions is omitted.

Third Embodiment

FIGS. 7 to 10 show a third embodiment of the present invention. In the third embodiment, in addition to the first embodiment, the second support section 29b supports the motor-side housing 13b of the driving unit 11a (driving device 11) so as to be movable around the center in the width direction of the frame 1.

In referring to this structure, the second support section 29b employs the structure that combines a pair of rail structures 31 installed at a lower part of each side rail 3, a support shaft section 40 (equivalent to the second rotary support shaft of this application) supported on the side rail 3 so as to be movable in the vehicle front-rear direction via the rail structure 31 and a support shaft 50 (equivalent to the third rotary support shaft of this application) coupling between the support shaft section 40 and the motor-side housing 13b so as to be movable around the center of the frame 1 in the width direction.

Specifically, as shown in FIG. 9, the rail structures 31 include the rail groove bodies 32 formed in a substantially C shape in cross section and the circular bearings 35 rollably housed in substantially C-shaped rail grooves formed by the rail groove bodies 32 as already explained in the first embodiment.

As shown in FIGS. 7 and 9, the support shaft section 40 includes a disk-shaped housing section 40a disposed at the center between the side rails 3, a pair of cylindrical sections 40b extending at a predetermined length from the housing section 40a to both sides in the Y direction, and a pair of support shafts 40c that project forward from the distal end portions of each cylindrical section 40b. The distal end portions of each support shaft 40c are fit into the inner laces 35a of the circular bearings 35 and allow the motor-side housing 13b to move in the front-rear direction with respect to the side rails 3 (the vehicle body).

Consequently, for example, when the both wheels climb over a protrusion on the road surface α, with the differential-side housing 13a including the axle housings 21 set on a movable side, the entire driving unit 11a is swung around the support shafts 40c.

Further, as shown in FIGS. 9 and 10, a bearing housing section 41 is formed at a center in the housing section 40a. The bearing housing section 41 is formed of a cylindrical wall penetrating in the X direction. A circular bearing 43 is fit into (or pressed into) the bearing housing section 41. As the circular bearing 43, for example, two-row roller bearings, in which pluralities of rollers 43c are interposed between the circular inner laces 43a and the circular outer laces 43b, are used. An opening on the opposite side of the driving unit 11a of the cylindrical section is closed by a cover 44.

Meanwhile, as shown in FIGS. 7 to 9, among the end portions of the motor-side housing 13b, for example, a shaft mounting seat 13c is formed at an end portion corresponding to the center between the side rails 3. One end of the support shaft 50 is attached to the shaft mounting seat 13c via a bracket 47, which projects the other end of the support shaft 50 toward the bearing housing section 41. At the center of an end face of the projecting support shaft 50, a screw shaft section 50a is provided in a projecting manner. In the case where the shaft mounting seat 13c is not provided, the support shaft 50 may be integrally formed with the motor-side housing 13b.

As shown in FIGS. 9 and 10, the other end of the support shaft 50 is fit into the circular inner lace 43a of the circular bearing 43 and assembled to the support shaft section 40. The screw shaft section 50a at the end of the support shaft 50 penetrates the cover 44 via a sleeve-shaped washer 45. A nut member 51 is screwed into the screw shaft section 50a that penetrates the washer 45, which rotatably couples the support shaft 50 to the support shaft section 40. Of course, the support shaft 50 also deals with a motion of the support shaft section 40 in the vehicle front-rear direction.

By employing the structure for rotatably coupling the support shaft 50 to the support shaft section 40, when a load and a shock in a torsional direction are input into the differential-side housing 13a including the axle housing 21, such as when one wheel climbs over a protrusion on the road surface α, a rotational motion with the support shaft 50 as a rotation center occurs between the unit housing 13 and the vehicle body.

The driving unit 11a is capable of performing a swing motion in the front-rear direction and a rotational motion in the width direction from an axle rigid structure configured by combining the first support sections 29a and the second support sections 29b to prevent a shock and a load transmitted from the axle housings 21 from being applied to the driving unit 11a as much as possible.

Action of the driving device 11 configured as explained above is explained. A driving force generated by the motor 15 is transmitted to the differential gear 19 through the speed reducer 17. The driving force is transmitted from the differential gear 19 to the left and right driving wheels 7 through the left and right drive shafts 23. The vehicle travels on the road surface α.

For example, it is assumed that a stepped part (not shown) projecting upward is present on the road surface α, and that both wheels of the left and right driving wheels 7 climb over the stepped part during traveling. At this point, a shock and a load involved in the climbing-over of the stepped part are input from the axle housings 21 on both right and left sides to the differential-side housing 13a disposed on the oblique lower side of the driving unit 11a.

At this point, the motor-side housing 13b disposed on the oblique upper side of the driving unit 11a is connected to the circular bearings 35 in the rail groove bodies 32 via the support shaft sections 40 and supported to be displaceable in the vehicle front-rear direction. Therefore, in the entire driving unit 11a, the differential-side housing 13a swings to be displaced to the upper side (to the lower side in the case of stepped part) with the motor-side housing 13b as a swing center. An arrow L in FIG. 8 indicates a swing track of the driving unit 11a at this point.

According to the swing of the driving unit 11a, the inner laces 35a of the circular bearings 35 rotate and the circular bearings 35 are displaced in the front-rear direction on the rail groove bodies 32. An arrow M in FIG. 8 indicates a direction in which the circular bearings 35 are displaced at this point.

Then, the entire driving unit 11a performs a swing motion with the support shafts 40c as a swing fulcrum.

Consequently, the shock and the load input to the driving unit 11a from the axle housings 21 are allowed to escape (absorbed) by the swing motion of the driving unit 11a that occurs according to the displacement in the up-down direction of the axle housing 21, as explained in the first embodiment. Therefore, the devices including the motor 15 integrally attached to the unit housing 13 are protected from the shock and the load applied to the devices.

Further, it is assumed that one side (one wheel) of the driving wheels 7 climbs over a projection (not shown) present on the road surface α during traveling. At this point, a shock and a load involved in the climbing-over of the projection are input from the axle housings 21 on either right or left side to the differential-side housing 13a disposed on the oblique lower side of the driving unit 11a.

At this point, the drive unit 11a is rotatably supported with the support shaft 40c via the support shaft 50 extending in the vehicle front-rear direction. Therefore, a relative rotational motion with the support shaft 50 as a rotation center occurs between the drive unit 11a and the frame 1. An arrow N in FIG. 7 indicates a direction in which a rotation displacement occurs at this point.

The shock and the load input to the driving unit 11a causes the stress in a torsional direction with respect to the driving unit 11a; however, they are allowed to escape (absorbed) by the rotational motion in the vehicle width direction that occurs between the driving unit 11a and the vehicle. Therefore, the devices including the motor 15 integrally attached to the unit housing 13 are protected from the shock and the load applied to the devices.

In particular, since the driving unit housing structure including the rigid axle has a relatively large weight, stress in the vehicle front-rear direction occurs in the support shaft section 40 and stress in the torsional direction occurs in the support shaft 50 when a swing motion and a rotational motion are performed. Consequently, it is likely that reliability of the motor 15 is deteriorated. However, as explained above, the configuration is adopted in which the support shaft section 40 is movable in the vehicle front-rear direction and further the support shaft 50 is rotatably coupled to the support shaft section 40. Therefore, it is possible to reduce the stress in the vehicle front-rear direction input to the support shaft section 40 and the stress in the torsional direction input to the support shaft 50. Consequently, it is possible to secure the reliability of the motor 15. Note that, in FIGS. 7 to 10, the same portions as the portions in the first embodiment are denoted by the same reference numerals and signs and explanation of the portions is omitted.

Note that the present invention is not limited to the first, second and third embodiments and may be variously modified and carried out without departing from the spirit of the present invention. For example, in the first to third embodiments explained above, the example is explained in which the rail groove bodies are disposed on the vehicle width direction outer side from the side rails. However, the present invention is not limited to this. The rail groove bodies may be disposed on the vehicle width direction inner side from the side rails or may be disposed in the side rails. The present invention is applied to the commercial electric vehicle. However, naturally, the present invention is not limited to this and may be applied to various vehicles including a passenger car.

REFERENCE SIGNS LIST 3 side rail (vehicle body)
7 driving wheel
9 leaf spring
11 driving device (vehicle driving apparatus)
13 unit housing (driving unit housing)
13a differential-side housing
13b motor-side housing 15 motor
17 speed reducer
19 differential gear
21 axle housing
23 drive shaft
27d, 30a pin member (first rotary support shaft)
29a first support section
29b second support section
31 rail structure
32 rail groove body
35 circular bearing
37, 40 support shaft, support shaft section (second rotary support shaft)
38 sliding block
50 support shaft (third rotary support shaft)

The invention claimed is:

1. A vehicle driving apparatus, comprising:
a motor that drives a vehicle;
a driving unit housing that integrally houses the motor;
a speed reducer coupled to the motor;
a differential gear coupled to the speed reducer, the differential gear transmitting a driving force of the motor to driving wheels of the vehicle;
an axle housing to which a differential-side housing of the driving unit housing is coupled, the axle housing integrally housing a drive shaft of the driving wheels;
a first support section that elastically couples a first rotary support shaft coupled to a vehicle body of the vehicle and the axle housing and performs a swing motion with the first rotary support shaft as a rotation center to support the axle housing on the vehicle body; and
a second support section that couples a second rotary support shaft supported on the vehicle body of the vehicle via a rail structure and a motor-side housing of the driving unit housing and performs a swing motion with the second rotary support shaft as a rotation center to support the motor-side housing on the vehicle body;
wherein the rail structure is configured such that the second rotary support shaft is movable in a vehicle front-rear direction.

2. The vehicle driving apparatus according to claim 1, wherein the second rotary support shaft is provided such that a rotation center of the motor and a rotation center of the second rotary support shaft coincide with each other.

3. The vehicle driving apparatus according to claim 1, wherein the rail structure includes a rail groove body extending in the vehicle front-rear direction provided in the vehicle body of the vehicle and a circular bearing supported by the second rotary support shaft and displaceably housed in the rail groove body.

4. The vehicle driving apparatus according to claim 1, wherein the rail structure includes a rail groove body extending in the vehicle front-rear direction provided in the vehicle body of the vehicle and a sliding block supported by the second rotating shaft and displaceably housed in the rail groove body.

5. The vehicle driving apparatus according to claim 1, wherein the second support section couples the second rotary support shaft and the motor-side housing of the driving unit housing via a third rotary support shaft, and the third rotary support shaft is coupled to the second rotary support shaft so as to be rotatable with the third rotary support shaft as a rotation center, thereby supporting the motor-side housing on the second rotary support shaft.

* * * * *